United States Patent
Sim et al.

(10) Patent No.: US 7,529,228 B2
(45) Date of Patent: May 5, 2009

(54) SCHEDULING METHOD FOR MULTI-CHANNEL DSP (DIGITAL SIGNAL PROCESSOR) ALGORITHM, VOP (VOICE OVER PACKET) SYSTEM, AND RECORDING MEDIUM

(75) Inventors: Jae-Cheol Sim, Daejeon (KR); Do-Young Kim, Daejeon (KR)

(73) Assignee: Electronics and Telecommunications Research Institute (KR)

(*) Notice: Subject to any disclaimer, the term of this patent is extended or adjusted under 35 U.S.C. 154(b) by 1072 days.

(21) Appl. No.: 10/834,964

(22) Filed: Apr. 28, 2004

(65) Prior Publication Data
US 2005/0047397 A1   Mar. 3, 2005

(30) Foreign Application Priority Data
Sep. 2, 2003   (KR) ............... 10-2003-0061084

(51) Int. Cl.
*H04L 12/66* (2006.01)
(52) U.S. Cl. .............. 370/352; 370/252; 370/412; 370/395.4
(58) Field of Classification Search .......... 370/352, 370/412, 395.4, 13, 105.1, 105.2; 709/235, 709/203
See application file for complete search history.

(56) References Cited

U.S. PATENT DOCUMENTS

| | | | |
|---|---|---|---|
| 5,621,720 A | * | 4/1997 | Bronte et al. ............ 370/241 |
| 5,995,540 A | | 11/1999 | Draganic |
| 6,269,095 B1 | | 7/2001 | Neubauer et al. |
| 6,292,835 B1 | * | 9/2001 | Huang et al. ............ 709/235 |
| 2002/0112097 A1 | | 8/2002 | Milovanovic et al. |
| 2006/0007871 A1 | * | 1/2006 | Welin ............ 370/252 |

FOREIGN PATENT DOCUMENTS

| | | |
|---|---|---|
| KR | 0189512 | 6/1999 |
| KR | 1020030065048 A | 8/2003 |
| WO | WO 01/35228 | 5/2001 |

OTHER PUBLICATIONS

Y.Chen et al., Design of a Weighted Fair Queueing Cell Scheduler for ATM Networks, GLOBECOM1998, pp. 405-410.

* cited by examiner

*Primary Examiner*—Curtis Kuntz
*Assistant Examiner*—Phung-Hoang J Nguyen
(74) *Attorney, Agent, or Firm*—Blakely, Sokoloff, Taylor & Zafman

(57) ABSTRACT

The present invention is directed to a scheduling method for processing at least two channels in a VoP (Voice over Packet) system. The VoP system according to the present invention includes a packet buffer for temporarily storing packets transferred from a packet network; a DSP (Digital Signal Processor) for processing algorithm modules of at least two channels; a scheduler for scheduling a channel to be executed by the DSP every cycle, and controlling the DSP to execute an algorithm module having a fixed execution time among the algorithm modules of the channels, and then an algorithm module having a variable execution time; and a TDM (Time Division Multiplexing) buffer for input/output to/from the TDM network.

7 Claims, 7 Drawing Sheets

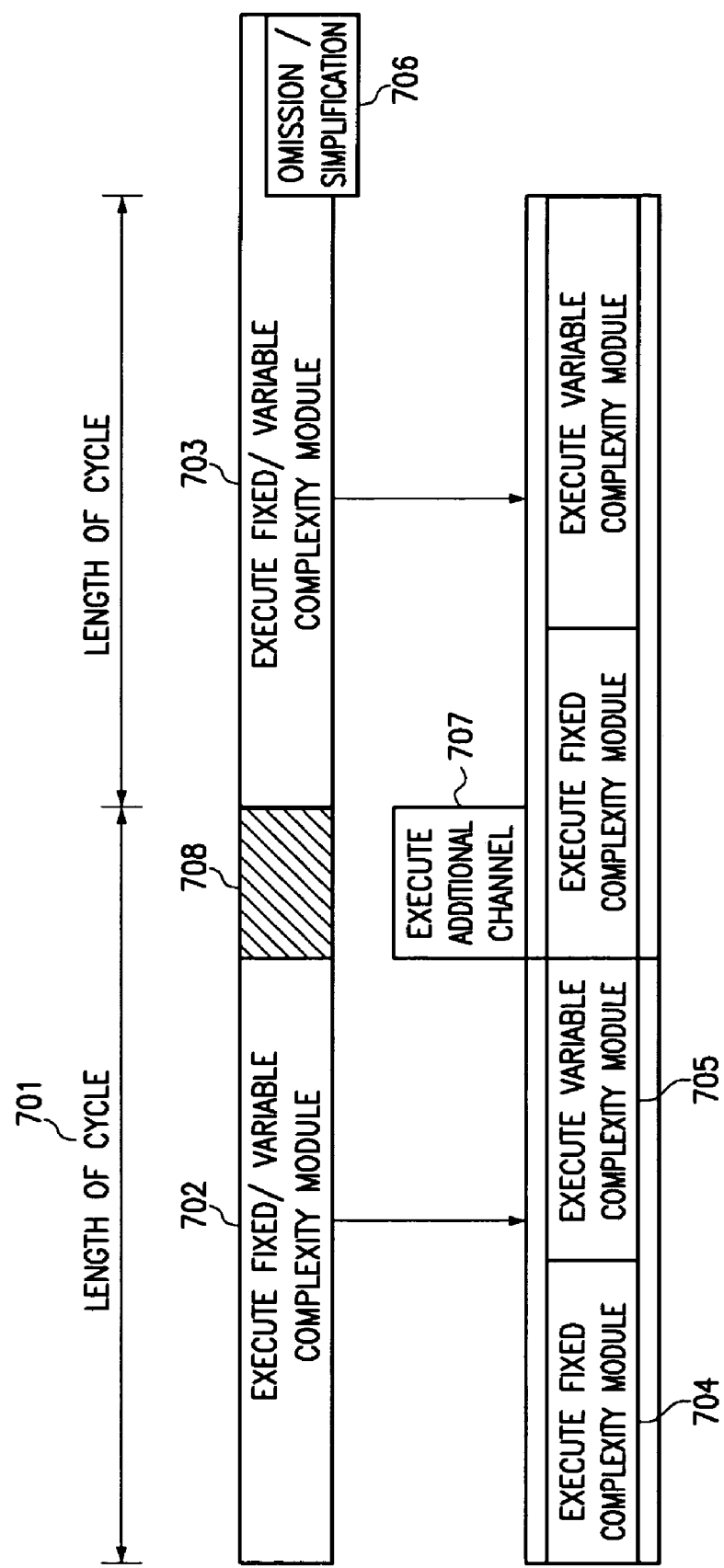

SCHEDULING METHOD FOR MULTI-CHANNEL DSP (DIGITAL SIGNAL PROCESSOR) ALGORITHM, VOP (VOICE OVER PACKET) SYSTEM, AND RECORDING MEDIUM

CROSS REFERENCE TO RELATED APPLICATION

This application claims priority to and the benefit of Korea Patent Application No. 2003-61084 filed on Sep. 2, 2003 in the Korean Intellectual Property Office, the content of which is incorporated herein by reference.

BACKGROUND OF THE INVENTION (a) Field of the Invention

The present invention relates to a VoP (Voice over Packet) system. More specifically, the present invention relates to a scheduling method that allows a DSP (Digital signal Processor) to process at least two channels in a VoP system.

(b) Description of the Related Art

The DSP of the VoP system executes algorithms of echo cancellation, fax/modem transmissions, voice codec, etc. to encode voice signals into packets, and to decode packetized voice to analog signal as illustrated in FIG. 4. The packets thus generated contain coded voice and a timestamp, which represents time that packet is generated. These packets are transmitted over packet networks. Voice can be reproduced with the coded voice and its time stamp in the transmitted packet.

However, delay from sender to receiver is not constant and dynamically varies on the network situation. In an attempt to eliminate the effect of the delay difference, a delay time distribution 201 is predicted and the packets are stored in the buffer for a time period 202 long enough to minimize the effect of the delay difference, as illustrated in FIG. 2.

In addition, the channels to be processed in the DSP must be properly scheduled to avoid the case where the TDM(Time Division Multiplexing) buffer is empty, so as to prevent a deterioration of the voice quality in decoding the packets received from the packet network. Also, the channels must be scheduled to minimize the delay when the voice data are encoded and transferred from the TDM network to the packet network.

For a specific channel i processed in the DSP, the required time to output a packet from the network to the actual TDM hardware or an analog telephone interface comes to $T^i j + T^i p + T^i t$, where $T^i d$ is an average propagation delay in the network; $T^i j$ is a time designated to store a received packet in a jitter buffer; $T^i p$ is the longest time required for voice processing in the DSP; and $T^i t$ is a buffering time for the processed voice being sent to the TDM hardware or the analog telephone interface. The packet sent to the network contains a time stamp that indicates the time when the packet is transferred from the sender.

Conventionally, the packet is not processed but is stored for a time of $T^i j$ so that $T^i t$ is a very short constant time. By processing channels for a time of $T^i d + T^i j$, the fluctuation of the propagation delay in the network can be absorbed to enable a continuous output of voice. In this method, the jitter of the network is absorbed but the DSP has to schedule the channels at an appropriate time because $T^i t$ is extremely short. Otherwise, a deterioration of the voice quality occurs.

The required processing time of the algorithms for a channel executed on the DSP is not constant and multiple channels are processed in a DSP. So the processing load of the DSP fluctuates at all times, as illustrated in FIG. 3.

Each channel cannot be properly processed when it does not have sufficient execution time. Conventionally, the maximum number of channels that can be processed in the DSP is determined based on the maximum execution time required for the algorithms.

This determination method is, however, disadvantageous in that the DSP would be idle because each channel processing does not always require the maximum execution time. This inefficiency is more evident when variance of minimum and maximum execution time is large.

The conventional method for executing DSP algorithms requiring a different processing capability from time to time is disclosed in U.S. Pat. No. 5,995,540.

The method disclosed in U.S. Pat. No. 5,995,540 enhances the processing efficiency of the DSP by regularly executing the DSP algorithms and then using an surplus processing resource for the execution of user application programs. This method is, however, inapplicable to the systems such as a VoP gateway in which only the DSP algorithms are repeatedly executed on a DSP without any other application program.

Another conventional scheduling method for DSP algorithms is disclosed in International Publication No. 01/35228.

International Publication No. 01/35228 is directed to a multi-channel scheduling method that its number of channels is determined on their average execution time.

This method estimates whether or not all channel can be executed properly with sufficient execution time every cycle. In case of deficiency of the processing capacity, several channels are selected as victims and their processing is simplified or omitted so as to process all channels until the end of each cycle. This method may be successful in processing a larger number of channels relative to the other conventional methods, but encounters a problem that the quality of the processing result can deteriorate because the processing for channels selected as victims is simplified or omitted.

SUMMARY OF THE INVENTION

It is an advantage of the present invention to provide a scheduling method of multi-channel DSP algorithms for accommodating a larger number of channels in one DSP by utilizing the processing capability of the DSP in a VoP system efficiently.

It is another advantage of the present invention to provide a scheduling method of multi-channel DSP algorithms that is capable of processing a large number of channels and is excellent in quality of the processing result.

In one aspect of the present invention, there is provided a VoP (Voice over Packet) system, which is for processing at least two channels, the VoP system including: a packet buffer for temporarily storing packets transferred from a packet network; a DSP (Digital Signal Processor) for processing algorithm modules of at least two channels; a scheduler for scheduling a channel to be executed by the DSP every cycle, and controlling the DSP to execute an algorithm module having a fixed execution time among the algorithm modules of the channels, and then an algorithm module having a variable execution time; and a TDM (Time Division Multiplexing) buffer for input/output to/from the TDM network.

In the VoP system, some DSP algorithms for a channel have fixed execution time and other algorithms have variable execution time. And these all algorithms for each channel should be executed every cycle. Each cycle the scheduler let the DSP execute the algorithm modules having a fixed execution time. And then calculate the deadline for processing each channel with the execution result of the fixed execution time algorithm. The variable execution algorithms for each channel are scheduled to be executed by the DSP in order of the closest deadline.

When there is slack time after the execution of all algorithm modules for all channels, the scheduler schedules algorithm modules, which can be executed in the next cycle, to be executed in advance in the current cycle.

The scheduler includes a scheduling list, and the scheduling list includes a list of channels to be processed by the DSP.

The scheduling list further includes identifiers of channels such as channel numbers, directions, the algorithm modules for processing the channels, the dependency of the algorithm modules, and the estimated execution time for each algorithm modules.

The VoP system further includes: a buffer controller for checking the status of the packet buffer and the TDM buffer, and requesting the scheduler to process the corresponding channel when data are received from the packet network or the TDM network.

Upon receiving a packet from the packet network, the buffer controller checks whether or not the TDM buffer is empty. The buffer controller inserts dummy data in the TDM buffer of as much as a buffering time of the packet buffer when the TDM buffer is empty, and inserts the received packet in the packet buffer and updates the scheduling list. The buffer controller inserts the received packet in the packet buffer when the TDM buffer is not empty, and updates the scheduling list when the packet is present at the head of the packet buffer.

The scheduler controls the DSP to execute the algorithm module having a fixed execution time and then predicts a required time for execution of the corresponding channel by using the execution result of the algorithm module.

The scheduler, if scheduling a channel from the TDM network to the packet network, delays execution of the channel to the next cycle when a maximum delay time required to a service of the channel minus a consumed time of the TDM buffer minus the predicted required time for execution of the channel is longer than the length of the cycle.

The scheduler, if scheduling a channel from the packet network to the TDM network, delays execution of the channel to the next cycle when a time required consuming data stored in the TDM buffer minus the predicted execution time required for execution of the corresponding channel is longer than the length of the cycle.

In another aspect of the present invention, there is provided a scheduling method, which is for a multi-channel VoP system, the scheduling method including: (a) processing an algorithm module having a fixed execution time among algorithm modules for the channels; (b) calculating a deadline of each channel using the processing result of the step (a); (c) processing an algorithm module having a variable execution time in the order from a channel having a closest deadline to a channel having a farthest deadline; and (d) processing the algorithm modules that can be delayed until the next cycle when there is slack in the cycle time in advance.

In the scheduling method, the step (a) includes: calculating a deadline of each channel; sorting the deadlines by channels to determine channels to be executed in the current cycle; and executing an algorithm module having a fixed execution time of the determined channels.

BRIEF DESCRIPTION OF THE DRAWINGS

The accompanying drawings, which are incorporated in and constitute a part of the specification, illustrate an embodiment of the invention, and, together with the description, serve to explain the principles of the invention.

FIG. 7 shows a comparison of a conventional scheduling method and a scheduling method according to an embodiment of the present invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

1. The Multi-Channel VoP System According to an Embodiment of the Present Invention.

Figure 1:
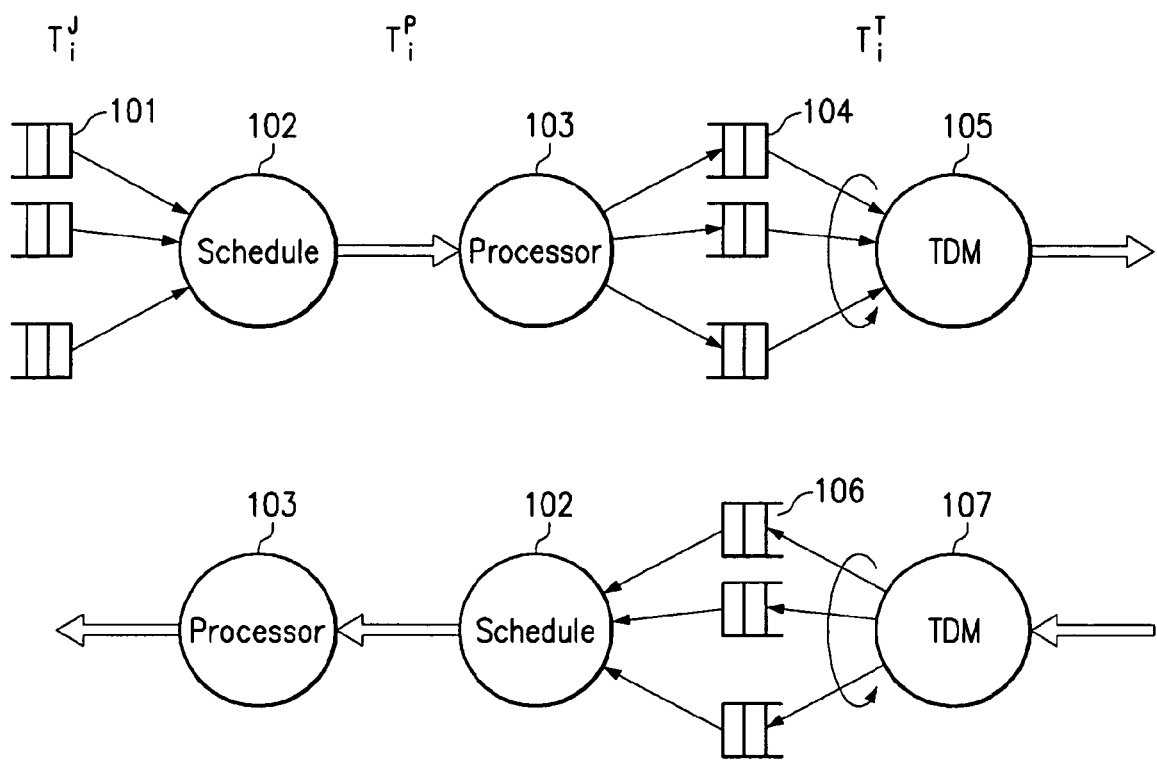
FIG. 1 shows a logical structure of processing in the DSP for VoP systems.
Figure 2:
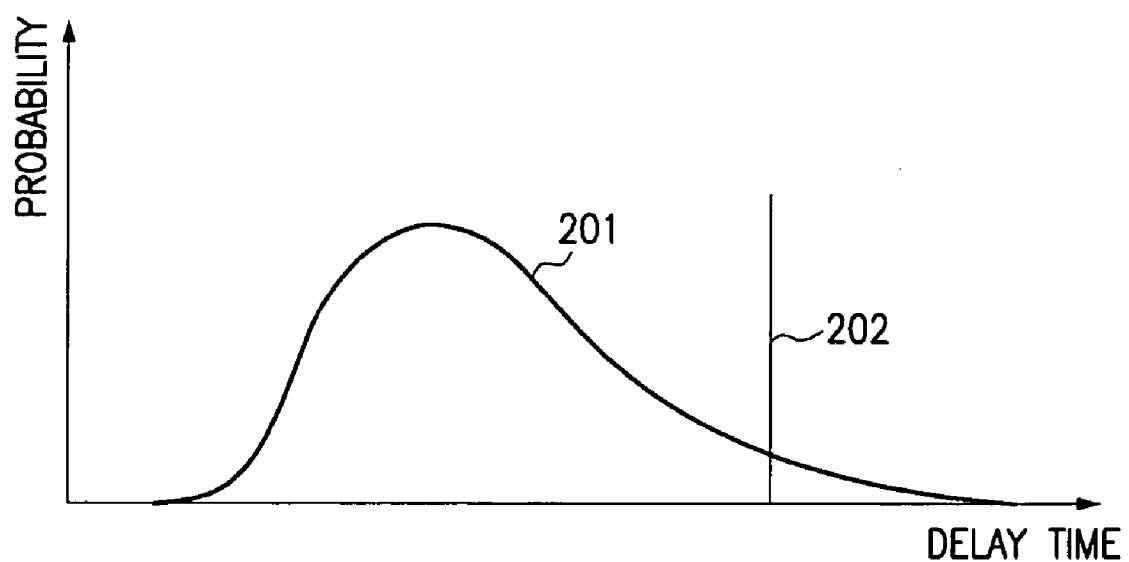
FIG. 2 is a graph of probability distribution showing the relationship between the delay time distribution of packets in packet networks and the buffering time for absorbing delay variance.
Figure 3:
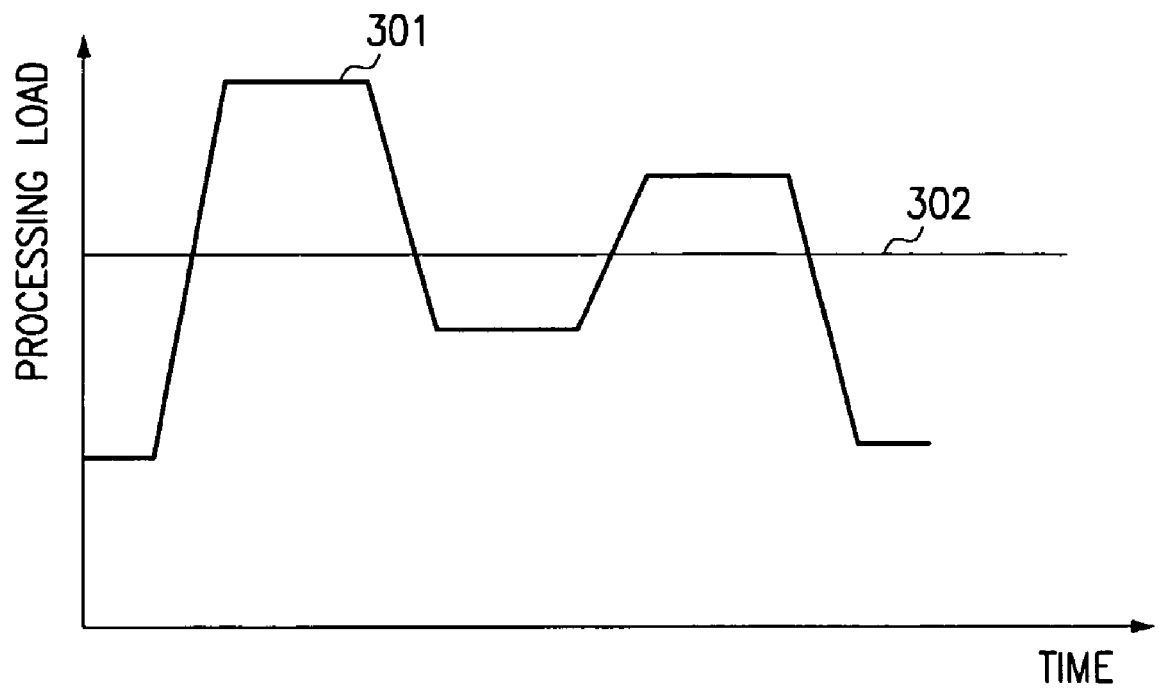
FIG. 3 is a load status diagram showing the relationship between the processing load in the DSP of the voice channel and time.
Figure 4:
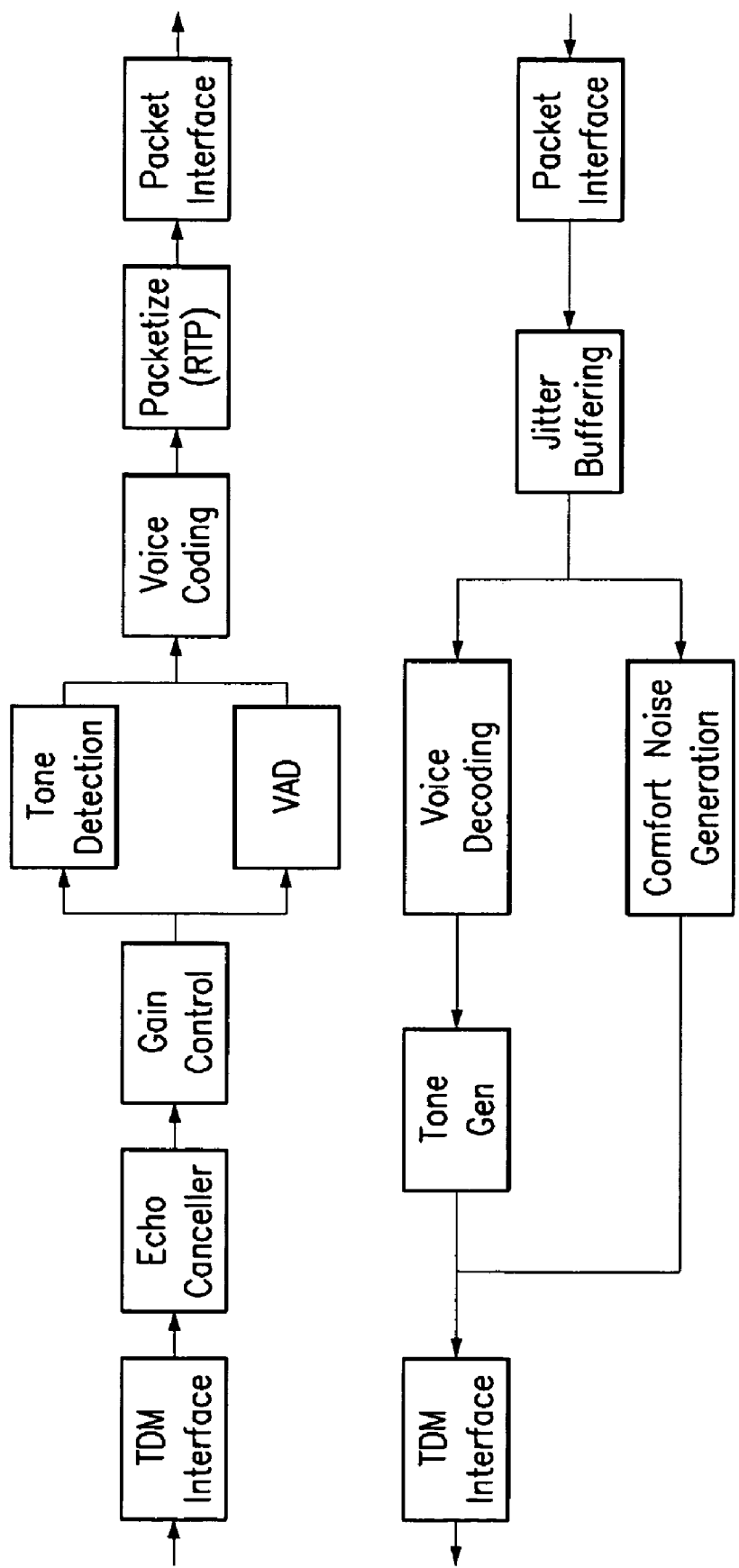
FIG. 4 is a block diagram showing the dependency of DSP algorithm modules for voice channels in the DSP.

FIG. 1 shows a logical structure of processing in the DSP for VoP systems.

The multi-channel VoP system according to an embodiment of the present invention comprises, as illustrated in FIG. 1, a packet buffer 101, a scheduler 102, a digital signal processor (DSP) 103, TDM buffers 104 and 106, and a buffer controller (not shown).

The packet buffer 101 is for temporarily storing packets received from the packet network. The packet buffer 101 functions as a jitter buffer to absorb the effect of jitter occurring during a packet transmission, according to an embodiment.

The scheduler 102 includes a scheduling list, and it determines channels to be executed in the DSP 103 every specified cycle.

The TDM buffer 104 is for temporarily storing signals processed by the DSP 103 before the signals are sent to the TDM interface 105. And the TDM buffer 106 is for temporarily storing signals received from the TDM interface 107 before the signals are scheduled and processed.

The buffer controller controls buffers such as the packet buffer 101 and the TDM buffers 104 and 106, and adds the channels to be processed to the scheduling list, thus requesting the scheduler 102 to process the corresponding channel.

Hereinafter, a scheduling method of the multi-channel VoP system according to the present invention is described in further detail.

2. The Configuration of the Scheduling List According to an Embodiment of the Present Invention.

The scheduling list stores fundamental information for the operation of the scheduler 102.

More specifically, the scheduling list stores information as previously measured, such as the execution time of DSP algorithm modules for each channel, whether or not the execution time is constant, and maximum and minimum execution times and direction that direct which and how algorithms are to be executed.

The scheduling list also stores the dependency of the respective algorithm modules that indicates which algorithm module is to be first executed, and which algorithm module is executed according to the execution result of the previously executed algorithm module, and channel identifiers with which the scheduler can identify each channel to be processed.

3. The Operation of the Buffer Controller According to an Embodiment of the Present Invention.

The buffer controller according to an embodiment of the present invention requests the scheduler 102 to process a corresponding channel, when data are received from the packet network.

Figure 5:
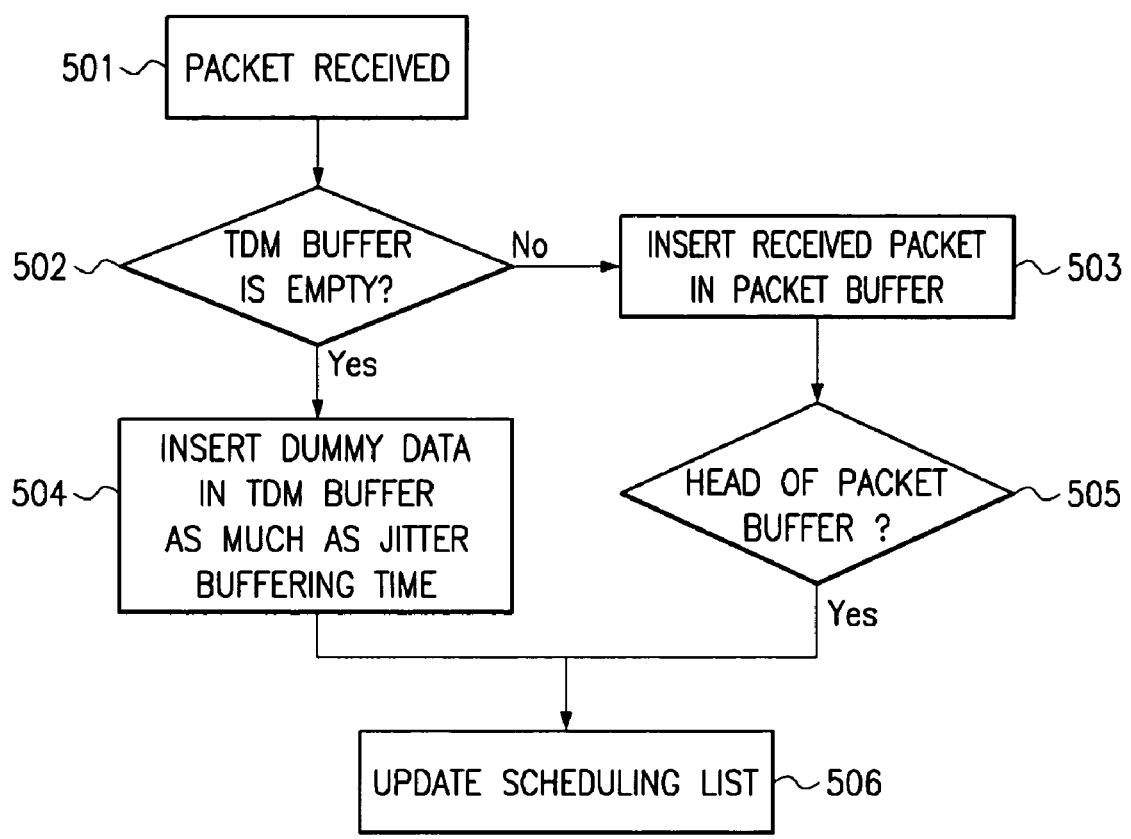
FIG. 5 is a flowchart showing the operation of a buffer controller according to an embodiment of the present invention.

FIG. 5 is a flowchart showing the operation of the buffer controller according to an embodiment of the present invention.

Upon receiving a packet from the packet network (in step 501), as illustrated in FIG. 5, the buffer controller analyzes the status of the output TDM buffer 104 and the packet buffer 101 (in step 502).

When the output TDM buffer 104 is empty, the buffer controller inserts dummy data of as much as a predetermined packet buffering reference in the output TDM buffer 104 (in step 504). Namely, the TDM buffer 104 can be empty when connection is newly established or when the jitter of packet network is larger than the predetermined packet buffering reference. In this case, the buffer controller inserts dummy data in the output TDM buffer 104 and then registers the corresponding channel to the scheduling list (in step 506) to request a service of the channel to which packet belong.

In case of HOL (Head Of Line) when the output TDM buffer 104 is not empty, the buffer controller registers the packet in the scheduling list to request a service of the channel (in step 505). For a non-HOL, the buffer controller stores the packet in the packet buffer 101. The channel corresponding to packet stored in the packet buffer 101 is registered in the scheduling list after the scheduler 102 schedules all channels corresponding to the HOL packet registered in the scheduling list.

Upon receiving data from TDM network, the buffer controller registers the channel corresponding to TDM data to the scheduling list.

4. Calculation of Deadlines.

The scheduler 102 determines the execution priority of channels, so as to satisfy the quality requirements of each channel such as processing delay, processing failure rate, etc.

For processing a packet transferred from the packet network to the TDM network, the TDM buffer 104 must never be empty so as to transfer data such as voice without discontinuity.

On the other hand, for processing data transferred from the TDM network to the packet network, the channels must be processed as soon as possible. But it is possible to satisfy the quality requirements by processing the channels in a period of less than the maximum delay time required.

Hence, the allowance time for processing a channel with a packet from the packet network is equal to the TDM buffer consumed time minus the execution time, and the allowance time for processing a channel with data from the TDM network is the required maximum delay time minus the TDM buffer latency time minus the execution time. Namely, the channel processing can be finished before the deadline for meeting the requirements if the processing begins within the allowance time.

A sequence of three deadline calculations is performed for the sake of the scheduling according to an embodiment of the present invention. The deadline is calculated so as to discriminate a channel to be executed during the corresponding cycle for each channel by every cycle.

The allowance time for processing a channel from the packet network to the TDM network=the TDM buffer consumed time−the execution time.

The allowance time for processing a channel from the TDM network to the packet network=the required maximum delay time−the TDM buffer latency time−the execution time.

The TDM buffer latency time and TDM buffer consumed time can be measured with the amount of data in TDM buffer, because the TDM data is stored and transmitted at a fixed rate.

According to these calculations, the channels of which the allowance time is shorter than the length of the cycle must be executed in the corresponding cycle. In addition, the channels of which the allowance is longer than the length of the cycle may be executed in the next cycle.

For the channels to be executed in the corresponding cycle thus selected, the modules having fixed execution time is executed before the execution of the modules having variable execution time. Hence, all the channels can be executed in the corresponding cycle when they satisfy $Tc<Sum(T^i pp)$, where $Tc$ is the length of the cycle, and $T^i pp$ is the execution time of the module having a fixed processing time for channels i. After the execution of the modules having a fixed execution time, the execution times of the modules having variable execution time are predicted with the execution result of the modules having fixed execution time and the deadlines of the channels are sorted to process modules having a variable execution time. All the selected channels can be executed in a given cycle when the sum of the variable execution times of the selected channels satisfies $Sum(T^i pv)<Tc-Sum(T^i pp)$, where $T^i pv$ is the execution time of the module having a variable execution time for selected channel i.

The module having a variable execution time for a selected channel cannot be processed in a given cycle when the above relationship is not satisfied. In this case, simplification or omission of processing can be employed. Contrarily, when $Sum(T^i pp)<Tc-Sum(T^i pp)$, there will be a remaining time of $Tc-Sum(T^i pp)-Sum(T^i pv)$, which is used for the execution of the channels that are not selected in the previous execution channel selection step because they have long enough allowance time. To choose the channels to be executed in this remaining time, the deadlines for each channel is sorted again and each selected channel is executed in the order of their deadline.

5. The Operation of the Scheduler 102.

The scheduler 102 operates on the basis of information in the scheduling list and controls each channel to use a processing resource at an appropriate time. The scheduler 102 determines channels to be executed each cycle and their execution order in a cycle.

The length of cycle is determined according to the execution period of the algorithm for channels. When a channel should be executed every 10 ms and another channel should be executed every 30 ms, for example, the smaller period is given as one cycle.

The scheduling list includes all information required for operation of scheduler such as "channel number," "direction," and "execution time."

The scheduler 102 executes the algorithm modules which have a fixed execution time and is used to analyze the complexity of the remaining algorithms module with its execution result. VAD(Voice Activity Detection) algorithm is an example. As a result of the algorithm execution, the characteristic of the input data can be determined to predict the processing time required to the subsequent work. Based on the processing time thus predicted, the deadline for each channel is calculated. The deadlines thus calculated are sorted such that a channel having the closest deadline is selected in priority.

Figure 6:
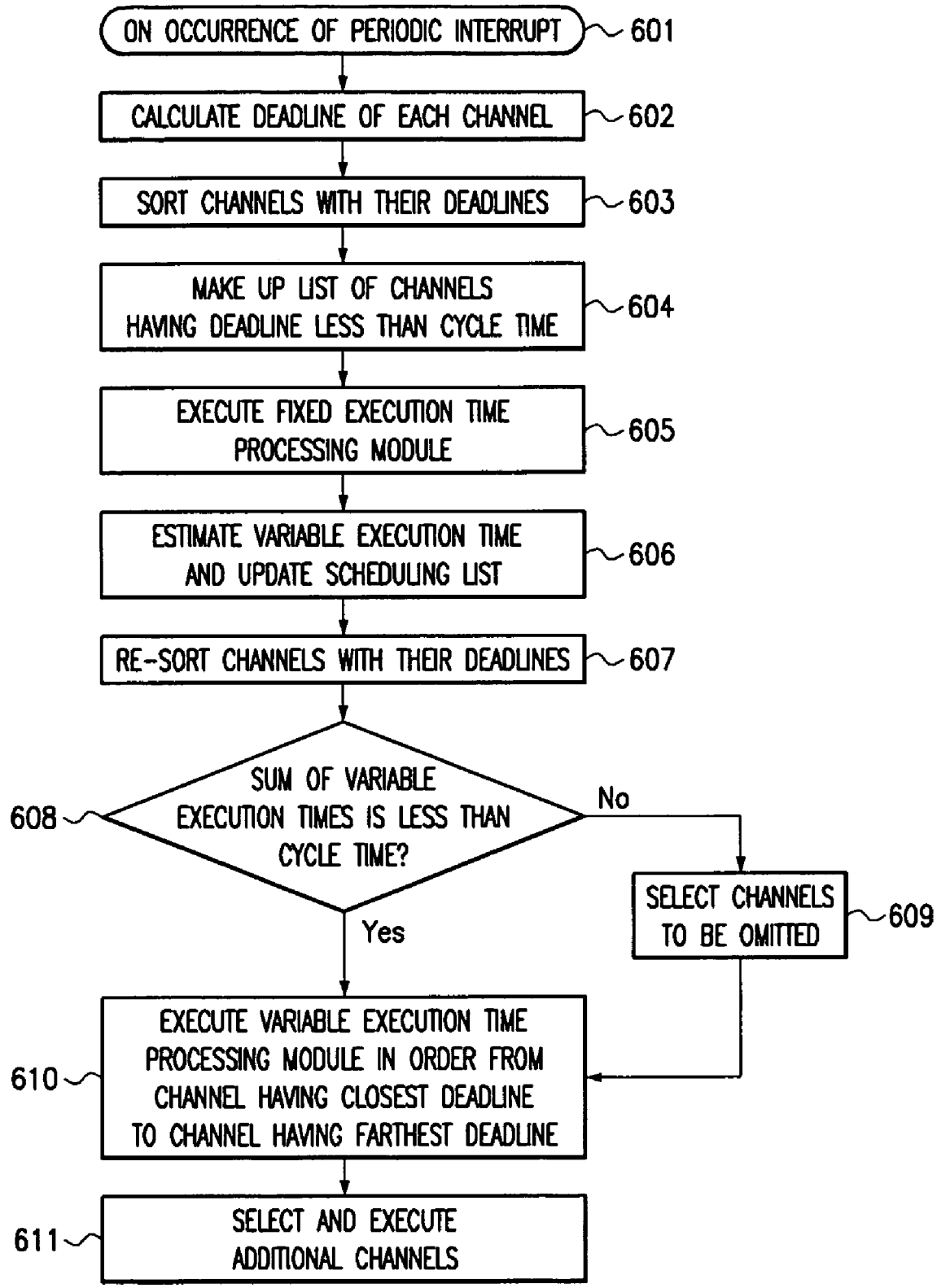
FIG. 6 is a flowchart showing the operation of a scheduler according to an embodiment of the present invention.

FIG. 6 is a flowchart showing the operation of the scheduler 102 according to an embodiment of the present invention.

The operation of scheduler 102, as illustrated in FIG. 6, is initiated by periodic interrupts, its period is Tc (in step 601), and the scheduler calculates the deadline of each channel at the start of the cycle (in step 602).

Subsequently, the scheduler 102 sorts channels by their deadlines (in step 603) and makes up a list of the channels of which the deadlines are less than the cycle time (in step 604).

Once the list is made up, the scheduler 102 executes a fixed execution time processing algorithms for channels included in the list in the order from a channel having a closest deadline to a channel having a farthest deadline(in step 605), and estimates the execution time of algorithm having the variable execution time to update the scheduling list with the estimated execution time (in step 606).

The scheduler 102 re-sorts channels by their deadline (in step 607), and determines whether or not the sum of the variable execution times is less than the remaining cycle time (in step 608). If the sum of the variable execution times is less than the remaining cycle time, then the scheduler 102 executes the variable execution time processing section in the order from a channel having a closest deadline to a channel having a farthest deadline (in step 610). If the sum of the variable execution times is greater than the remaining cycle time, then the scheduler 102 selects channels to be omitted (in step 609), executes the variable execution time processing section in the order from a channel having a closest deadline to a channel having a farthest deadline (in step 610).

After the processing for channels to be executed in a cycle, if there are remaining cycle time, the scheduler selects and executes algorithms for additional channels, which can be processed in the next cycle (in step 611).

By the scheduling method, the same channel may be selected as the channel to be omitted in succession. To avoid this case, an additional method can be used in selecting the channels to be omitted.

6. Comparison of the Conventional Scheduling Method with a Scheduling Method According to an Embodiment of the Present Invention.

Unlike the conventional method that processes each channel with only fixed interval, the scheduling method according to an embodiment of the present invention executes the fixed execution time and inevitable algorithm modules in front of the execution of variable execution time or selective algorithms modules, estimates the execution time of variable execution time algorithm modules with the execution results of fixed execution time algorithm modules. The scheduling method according to the present invention also adjusts the priority of channels to be executed according to the target delay and the estimated execution time, determines the execution order based on the amount of data stored in the TDM buffer 104 and the target maximum delay time, and additionally executes channels that need to be executed in the corresponding cycle when there is an allowance in the processing resource after the channels scheduled by the scheduler 102 are all executed.

FIG. 7 compares the conventional method with the scheduling method according to an embodiment of the present invention. In FIG. 7, the upper diagram shows the conventional method and the lower one shows the scheduling method according to an embodiment of the present invention.

Hereinafter, a description will be given to a comparison of the conventional scheduling method and the scheduling method according to an embodiment of the present invention.

The conventional scheduling method executes all the modules for processing one channel without any discrimination, as illustrated in FIG. 7. Thus in case of scheduling based on the average execution time of channels, the execution time is less than a given cycle length when lots of channels can be processed with shorter execution time than the average execution time in one cycle (in 702). Contrarily, when the channels require longer execution time than the average execution time in one cycle, the execution time exceeds the given cycle (in 703) and the part corresponding to the exceeded time must be omitted or simplified for execution (in 706).

On the other hand, the scheduling method according to an embodiment of the present invention classifies modules for processing each channels into the fixed execution time and inevitable modules and the variable execution time or selective modules in executing the modules. More specifically, the fixed execution time and inevitable modules for each channel are first executed (in 704) to accurately calculate a processing time required for execution of the variable execution time or selective modules. In this manner, the variable execution time or selective modules for each channel can be executed in a batch (in 705). According to this processing method, it is possible to accurately determine the processing time without executing all the modules, and the scheduling is performed based on the predicted processing time to enhance the efficiency of the processing resource.

In the conventional scheduling method, the received packets are stored in the jitter buffer, and whether or not it is the processing time is checked at regular intervals, to process the packets. So, the processing of channels does not start until a defined time even when the cycle has an allowance time (in 708).

Contrarily, the embodiment of the present invention uses a method of processing the received packets as rapidly as possible as the resource necessary for the processing allows, and storing the processing result in the TDM buffer 104. This makes it possible to additionally execute channels when the cycle time has an allowance time after the processing of the channels (in 707).

The conventional method processes data transferred from the TDM buffer 104 at predetermined time intervals. But the embodiment of the present invention may postpone the processing so long as it satisfies the required maximum delay time, as a result of which an allowance time can be acquired for the case that the sum of necessary processing time for all channels is longer than the length of the processing cycle for some processing cycle. Accordingly, the channels that are simplified or omitted in the conventional method can be additionally executed during the acquired allowance time, so as to prevent a deterioration of voice quality.

Furthermore, the processing time is not determined based on the absolute timestamp recorded in the packet, but is based on the amount of data stored in the buffers, so it can be easily realized.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A VoP (Voice over Packet) system, which is for processing at least two channels, the VoP system comprising:
   a packet buffer for temporarily storing packets transferred from a packet network;
   a DSP (Digital Signal Processor) for processing algorithm modules of at least two channels;
   a scheduler for scheduling channels to be executed by the DSP every cycle of predetermined length, and controlling the DSP to execute an algorithm module having a fixed execution time among the algorithm modules of the channels, and then an algorithm module having a variable execution time, wherein the scheduler uses the execution result of the algorithm modules having a fixed execution time by the DSP to calculate a deadline for processing each channel, and further uses the calculated deadline based on the execution result of the algorithm module having a fixed execution time by the DSP to execute the algorithm module having a variable execution time in the order from a channel having a closest deadline to a channel having a farthest deadline; and
   a TDM (Time Division Multiplexing) buffer for input from the TDM network and output to the TDM network;
   wherein the scheduler schedules algorithm modules, which can be executed in a next cycle, to be executed in advance in the current cycle;
   wherein the scheduler, if scheduling a channel from the TDM network to the packet network, delays execution of the channel to the next cycle when a maximum delay time required for a service of the channel minus a consumed time of the TDM buffer minus the predicted required time for execution of the channel is longer than the length of the cycle;
   wherein the scheduler, if scheduling a channel from the packet network to the TDM network, delays execution of the channel to the next cycle when a time required to consume data stored in the TDM buffer minus the predicted execution time required for execution of the corresponding channel is longer than the length of the cycle.

2. The VoP system as claimed in claim 1, wherein the scheduler includes a scheduling list, the scheduling list including a list of channels to be processed by the DSP.

3. The VoP system as claimed in claim 1, wherein the scheduling list further includes identifiers of channels.

4. The VoP system as claimed in claim 1, further comprising:
   a buffer controller for checking the status of the packet buffer and the TDM buffer, and requesting the scheduler to process the corresponding channel when data are received from the packet network or the TDM network.

5. The VoP system as claimed in claim 4, wherein upon receiving a packet from the packet network, the buffer controller checks whether or not the TDM buffer is empty, the buffer controller inserting dummy data in the TDM buffer by as much as a buffering time of the packet buffer when the TDM buffer is empty, and updating the scheduling list, the buffer controller inserting the received packet in the packet buffer when the TDM buffer is not empty, and updating the scheduling list when the packet is present at the head of the packet buffer.

6. The VoP system as claimed in claim 1, wherein the scheduler controls the DSP to execute the algorithm module having a fixed execution time and then predicts a required time for execution of the corresponding channel by using the execution result of the algorithm module.

7. A scheduling method, which is for a multi-channel processing VoP system, the scheduling method comprising:
   (a) processing an algorithm module having a fixed execution time among algorithm modules of the channels;
   (b) calculating a deadline of each channel by using the processing result of the step (a);
   (c) processing an algorithm module having a variable execution time among the algorithm modules in the order from a channel having a closest deadline to a channel having a farthest deadline using the calculated deadline of step (b) based on the processing result of step (a); and
   (d) processing the algorithm modules that can be delayed until the next cycle when there is slack in the cycle time in advance;
   wherein the step (a) comprises:
   calculating a deadline of each channel;
   sorting the deadlines by channels to determine channels to be executed in the current cycle; and
   executing an algorithm module having a fixed execution time of the determined channels;
   wherein the scheduling method, if scheduling a channel from a TDM network to a packet network, delays execution of the channel to the next cycle when a maximum delay time required for a service of the channel minus a consumed time of a TDM buffer minus the predicted required time for execution of the channel is longer than the length of the cycle;
   wherein the scheduling method, if scheduling a channel from the packet network to the TDM network, delays execution of the channel to the next cycle when a time required to consume data stored in the TDM buffer minus the predicted execution time required for execution of the corresponding channel is longer than the length of the cycle.

* * * * *